United States Patent

[11] 3,578,971

[72] Inventor Harold J. Lasky
 55 E. Washington St., Evanston, Ill. 60602
[21] Appl. No. 777,923
[22] Filed Nov. 21, 1968
[45] Patented May 18, 1971

[54] MAMMOGRAPHIC X-RAY APPARATUS AND TECHNIQUE
5 Claims, 6 Drawing Figs.

[52] U.S. Cl. .................................................. 250/50, 250/65R
[51] Int. Cl. .................................................. G03b 41/16
[50] Field of Search ........................................ 250/65, 50; 128/2

[56] References Cited
UNITED STATES PATENTS

| | | | |
|---|---|---|---|
| 3,165,630 | 1/1965 | Bielat et al. .................. | 250/50(X) |
| 3,365,575 | 1/1968 | Strax .......................... | 250/50 |

Primary Examiner—James W. Lawrence
Assistant Examiner—A. L. Birch
Attorney—Kegan, Kegan & Berkman ABSTRACT: A method for radiographic examination of the female breast comprising X-raying the breast under conditions of gentle compression and concurrent gravitational suspension of the breast. Apparatus for carrying out the method of the invention.

Patented May 18, 1971

INVENTOR
HAROLD J. LASKY

Kegan, Kegan & Berkman
BY ATTYS.

Patented May 18, 1971  3,578,971

INVENTOR.
HAROLD J. LASKY
BY Kegan, Kegan & Berkman
ATTYS.

MAMMOGRAPHIC X-RAY APPARATUS AND TECHNIQUE

This invention relates to apparatus and methods for medical radiographic examination. More particularly, the invention is directed to improved apparatus and techniques for carrying out diagnostic X-ray examinations and for detecting internal growths including tumors, cancer and other types of defects and abnormalities.

Radiographic examination procedures have been widely used in the past for medical diagnosis and to detect tumorous body growths. In the specific application known as mammography, the techniques have been applied to the detection of breast tumors, cancer, and other growths, in the adult female breast. In conventional prior art diagnostic procedures it has been necessary to expose the subject to a relatively large amount of radiation, and prior art techniques often have failed to distinguish nonpalpable growths in spite of the use of excessively high radiation levels.

It is the aim of the present invention to obviate the shortcomings of prior techniques and to provide an improved method for the X-ray examination of the breast of a female subject under conditions such that internal structures are radiographically displayed for diagnostic visualization, in their most orderly anatomic arrangement and under conditions of reduced and substantially uniform tissue thickness to permit minimal radiation exposure and to ensure optimum field of examination, sharp image focus, and even image density.

Another object of the invention is to provide a method of effective diagnostic X-ray examination of the female breast under conditions of reduced intensity of radiation, decreased scattering of radiation energy, overall reduction in object-film distance, and complete immobilization of breast tissue.

In accordance with the practice of the invention, the aims are realized by carrying out the radiographic examination while gently yet firmly compressing the breast of a female subject, while the breast is gravitationally suspended.

An important object of the invention is to provide simple yet highly effective apparatus to facilitate carrying out the new technique of the invention.

A related object of the invention is to provide means for quickly and conveniently adjusting the spacing of wall means of the apparatus of the invention so that the wall spacing or separation is correlated with an elected, professionally determined, degree of controlled compression of the breast gravitationally suspended in a channel extending between the wall means, during X-ray exposure of the breast.

Other and further objects, features, and advantages of the invention will become apparent from a consideration of the following specification taken in conjunction with the drawings in which.

Figure 1:
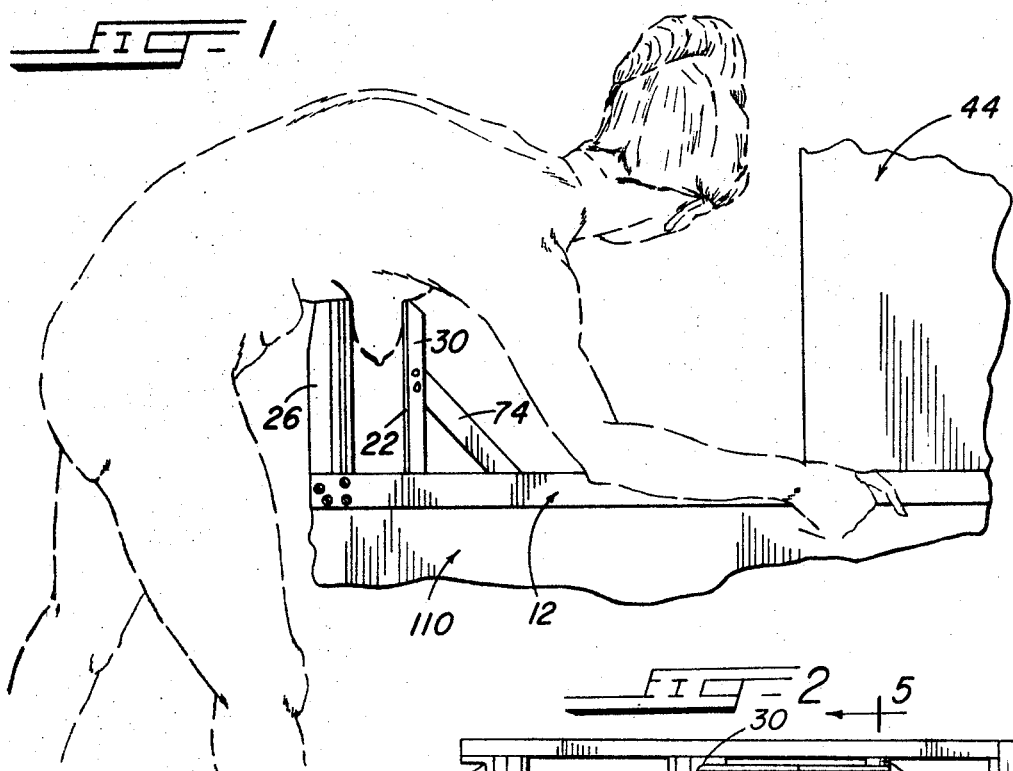
FIG. 1 is a side view of the device of the present invention, with the subject in position for making a cephalocaudal projection.
Figure 2:
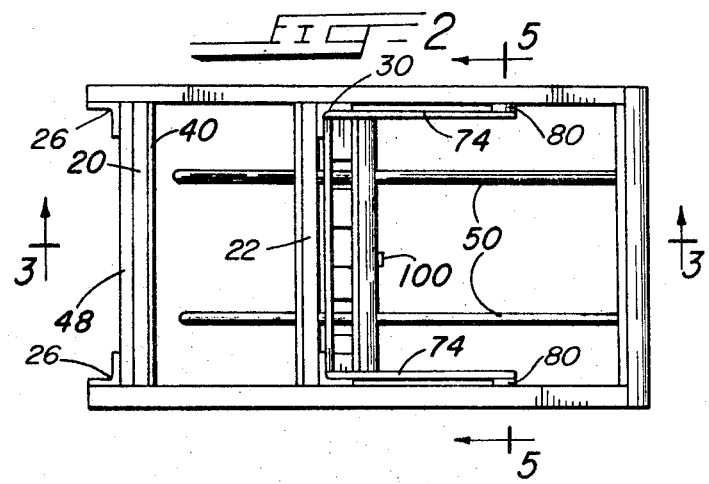
FIG. 2 is a top plan view of the device.

The aims and objects of the invention are realized through a novel radiation technique in which the examination of the breast is carried out while the breast is gravitationally suspended and while the breast is, concurrently, compressed, thus ensuring both an orderly anatomic arrangement and a more uniform tissue thickness. The examination is carried out using conventional X-ray equipment in conjunction with the simple mechanical accessory of the invention, a preferred embodiment of which is illustrated in the drawings and described more fully herebelow.

None of the published techniques for mammography takes full advantage of the compressability of the breast, and in none of the techniques have gravitational suspension and compression been combined. The concept is not found in the prior art. In one prior art procedure, while X-ray exposures are carried out with the breast positioned and compressed, the breast is not in a suspended position, and, in practice, the technique is not capable of achieving the results realized in accordance with the practice of the subject invention. In another prior art method the breast is X-rayed while in a depending or suspended position, but there is no compression and, again, the benefits of the technique of the subject invention are not realized.

The combination of breast suspension with breast compression is the essence of the subject invention. The prior art neither teaches nor suggests this combination, and the combination of techniques is in no sense obvious from a consideration of the relevant art. Compression reduces tissue thickness, permitting minimal exposure for a given film type, and provides more nearly uniform thickness. The exemplary device or apparatus of the invention provides the desired compression and enables filming the breast while the breast is in a vertical, suspended position, thus utilizing gravity to pull the largest possible portion of the breast over the film.

Referring more particularly to the drawings, the device 10 of the invention includes a frame, base, or platform 12, and a pair of generally parallel walls 20 and 22 carried by and extending upwardly of the base 12. The walls are made of radiation-transparent materials, clear rigid plastic sheets of polyalkylacrylate (Lucite or Plexiglas) being preferred. The plastic sheets 20 and 22 are carried in suitable frames 26 and 30, one frame 26 being fixed in position with respect to the base 12, and the other frame 30 and its associated sheet of plastic 22, being shiftable or movable to selectable positions nearer and farther from the fixed frame 26. The frame carried vertical walls 20 and 22 define therebetween the radiation chamber in which the breast is gravitationally suspended while the walls engage and compress the tissue.

An X-ray sensitive film 40, in a paper holder or other suitable container is placed between the breast and the fixed plastic sheet 20 which serves as a support. The movable sheet 22 provides the compression and locks in position, and the radiographic film 40 is exposed through the compressing sheet 22 by the horizontally projected X-ray beam emanating from an X-ray source 44. An X-ray impermeable backing or shield 48 is secured to the far side of the fixed frame 26.

Figure 3:
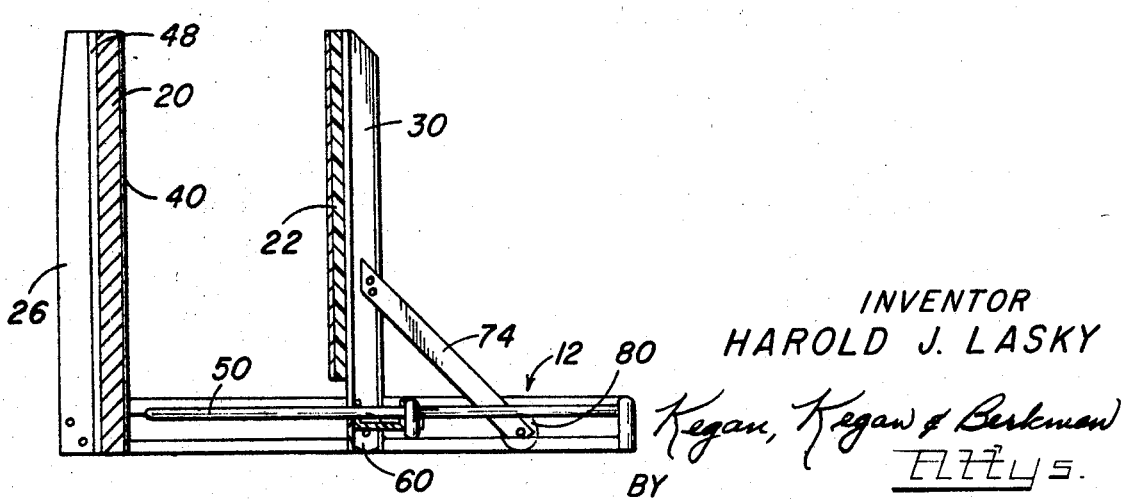
FIG. 3 is a cross-sectional view of the device shown in FIG. 1 taken on the line 3—3 of FIG. 2.

Any preferred mechanical means may be utilized in effecting the controlled movement or shifting of the movable plastic wall 22. In the particular embodiment of the device illustrated, the base 12 carries a pair of spaced, horizontally extending slide bars, rods, or guides 50 which extend through and slidably support the laterally shiftable frame 30. Opposed lower end portions of the movable frame 30 carry bearings or wheels 60 which ride in cooperating tracks 66 fastened to and forming part of the base 12 of the device. Stabilization of the shiftable frame 30 to preclude pivotal rotation about its lower edge is effected by means of auxiliary struts or arms 74 fastened at their upper ends to the sidewalls of the frame 30 and projecting downwardly and outwardly and terminating at their lower ends in a second pair of bearings or wheels 80 which also ride in the tracks 66, as indicated schematically in FIG. 3.

The shiftable frame 30 is secured in any selectable position along the slide bars or rods 50 by means of a locking device 86 which may take any preferred form but which in the specific embodiment of the invention depicted comprises a clamp 90 brought into stressing engagement against the slide bars 50 by means of a shiftable pin 100.

Many refinements which may be incorporated in the simple apparatus of the invention will occur to those skilled in the art. Such optional features constitute no part of the invention itself. For example, the top edge portions of the sheets 20 and 22 may be provided with foam rubber pads. A removable lead blocker is useful for dividing the film. Permanently fixed lead markers may also be used. A sheet of lead secured to the assembly shields the patient's abdomen in the cephalocaudal position.

Films are exposed routinely in the cephalocaudal position (FIG. 1) and lateral-medial (FIG. 4) projections. The device 10 sets upon and is conveniently supported on an X-ray table 110 and need not be moved for any view. For the cephalocaudal view the patient stands at the foot of the table, facing the X-ray tube, bends forward until the chest rests on the support or upper edge portion of the fixed wall 20, suspends the breast between the plastic walls 20 and 22, and continues to bend until the chest wall above the breast is resting on the movable wall 22. The X-ray tube is positioned with the central ray at the top edge of the movable wall 22. Compression is applied, the patient's head turned and raised as much as possible without raising the chest, and the exposure made.

Figure 4:
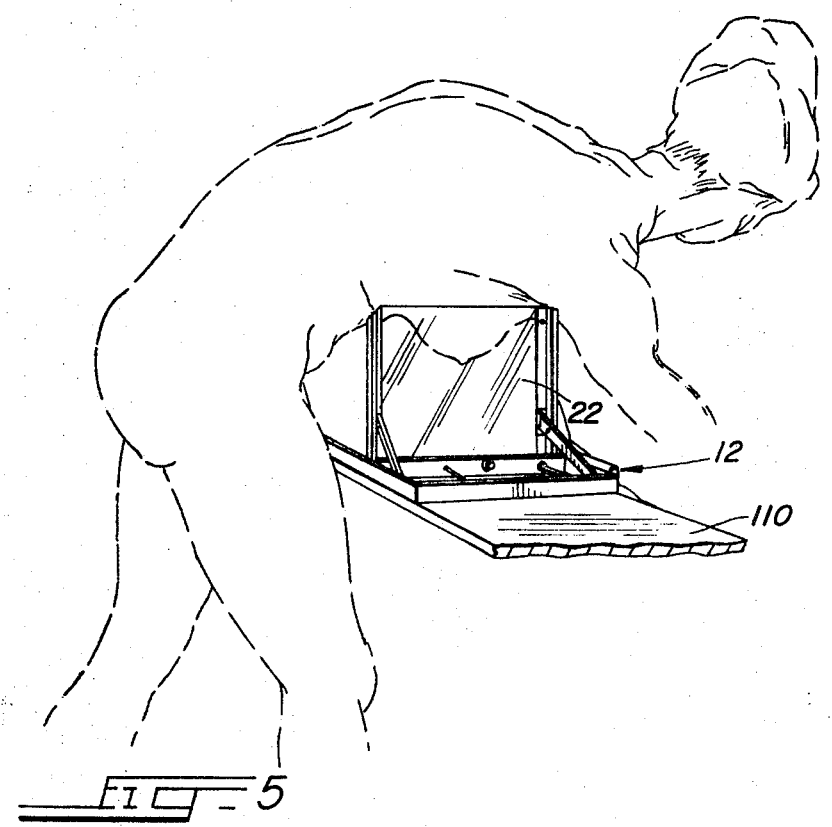
FIG. 4 is a perspective view of the device showing the subject in position for the lateral-medial view.
Figure 5:
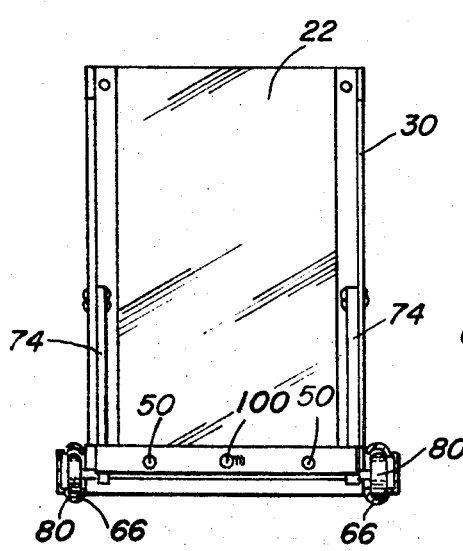
FIG. 5 is a cross-sectional view of the device taken substantially on the line 5—5 of FIG. 2.
Figure 6:
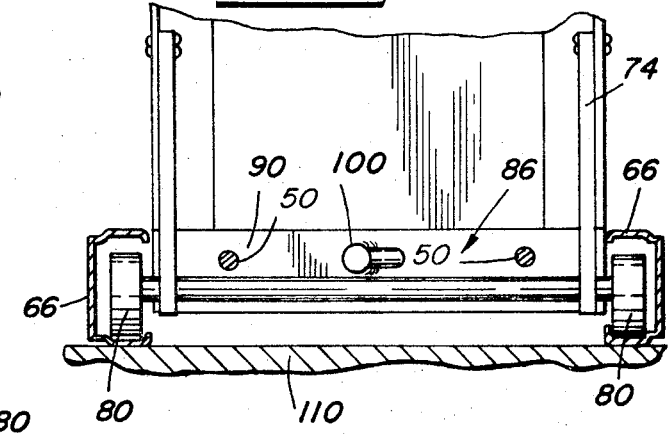
FIG. 6 is a fragmentary view of the device of the invention illustrating details of the shiftable wall structure and the wall-locking mechanism.

For the lateral-medial view, the patient stands at the side of the table 110 and bends forward and suspends the breast between the walls 20 and 22. In this position the arm is extended to bring the axillary fold in line with the breast, as shown in FIG. 4.

The film may be conveniently divided into two sections, the upper portion exposed, the lower portion shielded. Two exposures are thus obtained on a single film. Where the breast is too large, the lead shield is removed and the entire film is used.

Excellent quality radiographs have been obtained with Kodak Type M film using 200m, 3 seconds, 32 k at 27-inch distance, no filter. A semicircular cutout in a lead diaphragm is placed in the filter slot blocking out the unused upper portion of the beam.

The physical elements of the apparatus for carrying out the method of the invention may be fabricated of any suitable structural materials. It is important, however, that at least one and preferably both of the radiation-chamber defining walls 20 and 22 be visually transparent so that the positioning of the breast may be readily viewed to ensure proper placement for radiographic display. Lateral shifting of the movable wall 22 may be effected through the use of a stepwise, hand-operated ratchet and pawl assembly. Alternatively, a pneumatic cylinder with a hand-controlled actuating bulb may be used. Other suitable arrangements will occur to those skilled in the art. For all forms of the wall-shifting means employed, it is necessary that the operator be able to "sense" the degree of resistance to compression so as properly to control the pressure applied.

The technique of the present invention for breast compression for mammography has been found to be simple, fast and accurate and to provide a high degree of reproduceability. Motion of the patient has not been a problem. The technique has facilitated the preparation of oblique views which now are completely feasible. Flattening of the breast enhances penetration of the base. It will be appreciated that compression is most unlikely to present a hazard in respect to dissemination of malignancy in that the same force is applied around a tumor as within it. The technique of the invention requires no special cones or equipment changes and produces uniformly high quality radiographs with minimum patient exposure. Patient acceptance has been uniformly good. Absorption by the intervening plastic sheets has posed no problem, nor has there been any deleterious effect on the image detail.

In view of the above-detailed disclosure certain changes which may be made in the technique and the apparatus without departing from the scope of the invention will readily occur to those skilled in the art. It is intended that all matter contained in the above description or shown in the accompanying drawings shall be interpreted as illustrative and not in a limiting sense.

I claim:

1. The combination with radiation apparatus including a radiation source for presentation to a compressible tissue to be examined, and means responsive to radiations from said radiation source to provide a visual image of said tissue, of means for confining said tissue and for applying controlled compression forces thereto during exposure of said tissue to said radiation source,
said means for confining said tissue including spaced wall means disposed to engage said tissue gravitationally suspended therebetween,
at least one of said wall means comprising a sheet of material transparent to visible light to facilitate viewing of the positioning of the breast to ensure proper placement for radiographic display,
means for shifting said wall means relative to each other to establish selectable spacings correlated with associated compression forces applied by said wall means to said tissue to establish a controlled through thickness of field of said tissue presented to said radiation source and to provide more uniform density in visual images produced.

2. In a radiation device for breast examination and including a radiation source and radiation-sensitive and responsive image display means, the improvement comprising:
a pair of generally vertically extending, spaced wall means relatively shiftable toward and away from one another to provide adjustable lateral separation therebetween,
guide means supporting said well means during shifting thereof,
adjustable locking and release means manipulatable to secure said wall means in relative selectable positions of lateral separation,
said wall means being positionable gently to compress a patient's breast gravitationally suspended to depend downwardly therebetween, whereby said wall means are effective to flatten, spread and shape the breast to establish an optimum field of examination and to ensure sharp image focus and even image density with a minimum of radiation exposure,
at least one of said wall means comprising a sheet of material transparent to visible light to facilitate viewing of the positioning of the breast to ensure proper placement for radiographic display.

3. An accessory for medical X-ray equipment to facilitate X-ray examination of the breast of a female subject while the breast is gravitationally suspended to ensure that internal breast structures are radiographically displayed in their most orderly anatomic arrangement, and while the breast is concurrently compressed to provide a reduced and a more uniform tissue thickness permitting minimal radiation exposure,
said accessory comprising:
first and second spaced wall means extending generally vertically and defining an upwardly opening channel adapted to receive the breast depending downwardly therewithin,
means supporting said wall means in selectable positions of relative separation,
spacing of said wall means being correlated with an elected, professionally determined, degree of controlled compression of the breast gravitationally suspended in said channel between said wall means during X-ray exposure of the breast,
at least one of said wall means comprising a sheet of material transparent to visible light to facilitate viewing of the positioning of the breast to ensure proper placement for radiographic display.

4. The mechanism as set forth in claim 3 and further comprising
locking means for securing said wall means in said selectable positions of relative separation.

5. The method of radiographic examination of the breast of a female subject under conditions such that internal breast structures are radiographically displayed in their most orderly anatomic arrangement to facilitate recognition of any distortions in the internal structures, and under conditions of reduced and substantially uniform tissue thickness to permit minimal radiation exposure said method comprising the steps of:

positioning the female subject so that the breast is gravitationally suspended between two spaced, generally vertically extending, relatively movable wall means defining an upwardly opening irradiation chamber therebetween, supporting a radiation-sensitive and responsive visual indicator means proximate of and paralleling one of said wall means and axially in the path of a radiation beam to be directed against the breast to be examined, shifting one of said wall means toward the other of said wall means gently to compress the gravitationally depending breast therebetween, viewing the gravitationally depending, compressed breast through a one of said wall means transparent to visible light to ensure proper placement of the breast for radiographic display, restraining the shiftable said wall means in a selectable position correlated with an elected professionally determined degree of controlled compression of the breast, and energizing a radiation source to transmit a radiation beam through the compressed, suspended breast to impinge upon and sensitize said radiation-sensitive and responsive visual indicator means.